(12) United States Patent
McIntyre et al.

(10) Patent No.: US 10,154,627 B2
(45) Date of Patent: Dec. 18, 2018

(54) METHOD OF GROWING MYCOLOGICAL BIOMATERIALS

(71) Applicants: Gavin McIntyre, Troy, NY (US); Eben Bayer, Troy, NY (US); Amanda Palazzolo, Ballston Spa, NY (US)

(72) Inventors: Gavin McIntyre, Troy, NY (US); Eben Bayer, Troy, NY (US); Amanda Palazzolo, Ballston Spa, NY (US)

(73) Assignee: ECOVATIVE DESIGN LLC, Green Island, NY (US)

(*) Notice: Subject to any disclaimer, the term of this patent is extended or adjusted under 35 U.S.C. 154(b) by 1039 days.

(21) Appl. No.: 13/857,403

(22) Filed: Apr. 5, 2013

(65) Prior Publication Data
US 2013/0263500 A1 Oct. 10, 2013

Related U.S. Application Data

(60) Provisional application No. 61/686,443, filed on Apr. 5, 2012.

(51) Int. Cl.
A01G 18/00 (2018.01)
A01G 18/64 (2018.01)
A01G 1/04 (2006.01)

(52) U.S. Cl.
CPC ............. *A01G 18/64* (2018.02); *A01G 18/00* (2018.02)

(58) Field of Classification Search
CPC ........ A01G 1/046; A01G 18/00; A01G 18/61; A01G 18/64
USPC ............................................................ 47/1.1
See application file for complete search history.

(56) References Cited

U.S. PATENT DOCUMENTS

| | | | | |
|---|---|---|---|---|
| 8,313,939 B2* | 11/2012 | Kalisz et al. | ............... | 435/254.1 |
| 9,079,978 B2* | 7/2015 | Rasanen | ................... | C08B 3/14 |
| 2004/0000090 A1* | 1/2004 | Miller | ............... | 47/1.1 |
| 2008/0145577 A1* | 6/2008 | Bayer et al. | ................. | 428/35.6 |
| 2009/0307969 A1* | 12/2009 | Bayer et al. | ..................... | 47/1.1 |
| 2011/0094154 A1* | 4/2011 | Joaquin | .................. | A01G 1/046 47/65.8 |

* cited by examiner

*Primary Examiner* — Son T Nguyen
(74) *Attorney, Agent, or Firm* — Francis C. Hand; Carella, Byrne, Et Al

(57) ABSTRACT

A growth medium formed as an inoculum including a preselected fungus and a nutrient material capable of being digested by the fungus is placed in or on a tool formed of a material capable of being at least partially consumed by the fungus. The tool may define a cavity of predetermined shape for the growth medium or the tool may form a scaffolding on which the growth medium grows into the final product taking on the shape of the tool.

6 Claims, 1 Drawing Sheet

METHOD OF GROWING MYCOLOGICAL BIOMATERIALS

This application claims the benefit of Provisional patent application 61/686,443, filed Apr. 5, 2012.

This invention relates to a method of growing mycological biomaterials. More particularly, this relates to a method of growing mycological biomaterials in tools that are consumed or enveloped during the growth process.

BACKGROUND OF THE INVENTION

As is known from published United States Patent Application 2008/0145577, use can be made of a fungus to form composite materials by mixing an inoculum including a preselected fungus with discrete particles and a nutrient material capable of being digested by the fungus. It is also known from U.S. Pat. No. 8,001,719 to enclose and grow a fungal primordium in a mold to obtain a mass of fungal tissue in the form of low density chitinous material.

Generally, the methods employed for growing biomaterials of the above nature for a wide array of applications use enclosed plastic tools to house the materials as they grow. This presents several disadvantages:

The plastic tool only serves to produce one shape, and is not easily customizable for different applications after a product has been produced.

The plastic tool is easily broken during general handling and the biomaterial extraction process. This short life span requires periodic replacements to be manufactured.

The plastic tools take up a considerable amount of space and therefore are cumbersome to store and transport between stages of a manufacturing process.

The plastic tools must be thoroughly cleaned before and after each use because the manufacturing processes rely on the growth of a biological organism.

Accordingly, it is an object of the invention to provide a process for growing mycological biomaterials in a tool that is at least partially consumed in the process.

It is another object of the invention to provide a tool to house mycological biomaterials as they grow while contributing to the growth process.

It is another object of the invention to provide a process for growing mycological biomaterials in an economical manner.

Briefly, the invention provides a process of growing a mycological biomaterial comprising the steps of forming a growth medium including discrete particles, an inoculum including a preselected fungus and a nutrient material capable of being digested by the fungus; placing the growth medium in a tool defining a cavity of predetermined shape for the growth medium; and growing the fungus on and through the growth medium in the tool to form a product corresponding to the predetermined shape provided by the tool.

In another embodiment, the invention provides a process in which the growth medium is formed without discrete particles, i.e. the inoculum includes a preselected fungus and a nutrient material, such as grain spawn, capable of being digested by the fungus. In this embodiment, the growth medium is placed on a tool of predetermined shape formed of a material capable of being at least partially consumed by the fungus and defining a scaffold for the growth medium. The growth medium is allowed to grow on the tool to form a product corresponding to the predetermined shape of the tool with the fungus consuming at least some of the tool.

In this latter embodiment, the tool could be consumed entirely or in part by just the fungus carried on the nutrient material. In this context, the resultant product would be a thin walled material that is colonized with mycelium carried on a nutrient material (i.e. grain spawn). The consumable portion of the tool would serve as scaffolding and potentially nutrition depending on composition.

In accordance with the invention, the discrete particles may be of any suitable type including fibers that can be bound together with fungal mycelium to grant a specific form and function.

In one embodiment, the tool is made of a material that is formed of a material capable of being fully consumed by the fungus into the produced product. For example, the tool may made of at least one of paper pulp, bamboo, papier-mâché, gelatin, starches, plant fibers, paper fibers, burlap, plant-derived nonwovens and wovens, and pre-grown mycelium sheets.

In another embodiment, the tool is made of a material that is partially consumed by the fungus into the produced product. For example, the tool may be made of at least one of synthetic fibers, glass fibers, carbon fibers, nylon fibers and plastic mesh materials.

In this latter embodiment, mycelium will tolerate and bind to a variety of materials and substances during growth. These most intuitively encompass biological materials, such as plant fibers and particles like paper and burlap. The mycelium will also populate negative spaces between and around synthetic fiber materials, thus effectively partially "consuming" the tool.

In still another embodiment, the tool may be made of an unconsumable material, such as, polyethylene terephthalate (PETG) (a plastic) in the form of a tray.

Unconsumed tools, such as plastic trays that are partially open to the environment provide an opportunity for altering the growth environment of the biomaterial to achieve specific growth characteristics. Further, incubating the tools without lids in a controlled incubation environment would significantly reduce capital costs as there would not be a need for lids on the tools for regulating incubation conditions (RH, $CO_2$).

The growth environment of mycological biomaterials in such tools may use several possible options. These may be open-air incubation, filter-patch bags, controlled-environment incubators, controlled-environment rooms, and the like.

The tool used in the process may take several shapes. For example, the tool can be a woven or non-woven textile that is laid flat on the ground or other flat surface. In this case, a slurry of discrete particles and inoculum is poured on the textile tool. The textile would serve as a carrier for the complete product once the mycelium has grown and bound to the material of the textile.

Typically, the tools used in the process provide both strength and form to the grown product as opposed to imparting only strength as in Example 9 of published United States Patent Application 2008/0145577. The consumed tools grant both strength and form and are external to the discrete particles, i.e. are on the face of the final product (enveloped, or bound, with mycelium).

The following sets forth several application examples in accordance with the invention:

1. Spray application of starch or gelatin shell (see FIGS. 1-3)
    a. Gel-assisted casting of mycological biomaterials is a method used to form the substrate that the mycelium will bind in a specific shape that is grown outside of a tool. This is often aided by the use of a gelling agent. A consumable tool would also be invaluable for retaining substrate shape and feature resolution throughout the growing period. A starch, including seeds, such as Chia and Psylium seeds, or an alginate, such as, agar agar, or gelatin may be sprayed in liquid form onto the shape in an even coat immediately following casting. The resultant starch or gelatin shell would harden and hold the shape in place and be fully consumed as the mycelium colonizes the substrate.
2. Formed consumable tools
    a. These single-use tools are produced using a variety of materials and combinations of materials. Fibers (woven or nonwoven), paper pulp, substrate fibers, mycelium sheets, nutrients, and starches may be combined in any permutation to provide the necessary support for the desired shape of the biomaterial. This method would be similar to creating pressed paper products. Like the starch shell, this tool would be fully consumed during substrate colonization.
3. Molded plastic mesh
    a. A molded plastic mesh may be used as a tool in applications that require additional rigidity in the exoskeleton of the shape. A mycelium "skin" will form through and over the mesh while it remains in place, providing structure during and after the growing process.
4. Plastic trays partially open to the environment
    a. Plastic trays may be filled to grow biomaterials open to the environment, which may be controlled. This method uses considerably less plastic material than enclosed plastic tools.

The following sets forth several process examples in accordance with the invention:

EXAMPLE 1

Starch Shell Over Casted Substrate

Figure 1:
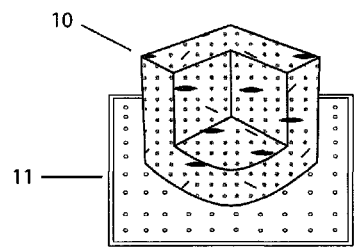
FIG. 1 illustrates a casting of mycological biomaterials in accordance with the invention.
Figure 2:
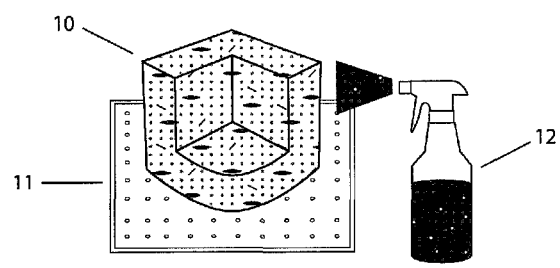
FIG. 2 illustrates the casting of FIG. 1 during a step of spraying the casting with a starch of gelatin to form a coating thereon.
Figure 3:
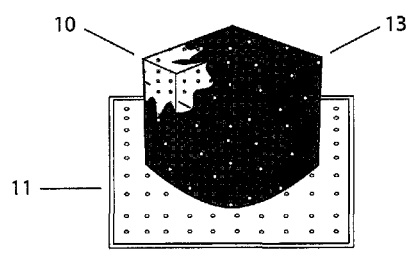
FIG. 3 illustrates the casting of FIG. 1 after the spray on coating has formed a harden shell in accordance with the invention.

1. A cotton burr substrate is sterilized, mixed with 20% v:v *Ganoderma tsugae* millet grain inoculum and cast into desired shapes 10 (only one of which is illustrated) on a perforated aluminum sheet 11 as illustrated in FIG. 1.
2. The shapes 10 are sprayed with an even coat of sterile 4 g/L cornstarch water as indicated in FIG. 2 from a suitable source, such as a spray container 12, with the coat subsequently hardening into a shell 13 over the casted shape 10 as indicated in FIG. 3.
3. The sheets of shapes are then incubated in large filter patch bags until fully colonized.
4. The parts are dried to 0% moisture.

EXAMPLE 2

Consumable Paper Fiber Tool

1. A slurry of cellulose fibers, hemicellulose, water, and nutrients is created, sterilized, and subsequently vacuum-pressed on a buck of the desired form. This process molds the tool.
2. Once the tool is formed, hardened, and dry, it may be filled with a mixture of sterilized buckwheat hulls and 20% (v:v) liquid culture inoculum of *Ganoderma tsugae*.
3. The part is allowed to incubate in a controlled-environment incubator at 90% relative humidity, 28° C., and 2000ppm $CO_2$.
4. Once the part has been fully colonized and the tool is completely consumed, the produced product is dried to 0% moisture.

EXAMPLE 3

Molded Plastic Mesh

1. The tool is created by thermoforming a plastic mesh material over buck of desired form. The mesh has large enough cavities to allow maximum airflow and small enough cavities to prevent substrate from spilling through.
2. The tool is filled with sterilized oat hulls and 20% v:v *Ganoderma tsugae* millet inoculum.
3. The part incubates in a controlled environment chamber at 99% relative humidity, 50% $O_2$ and 25° C.
4. Once the substrate is fully colonized and the mesh has been overgrown and is no longer visible, it may be dried to 0% moisture.

EXAMPLE 4

Plastic Trays Partially Open to the Environment

1. The plastic tray is created by thermoforming a plastic sheet over a buck of desired form.
2. The tool is filled with sterilized coconut coir and 20% v:v *Ganoderma tsugae* millet grain inoculum.
3. The part is incubated in a controlled-environment incubator at 30° C., 95% relative humidity, and 4000 ppm $CO_2$.
4. Once the part is fully colonized, it is dried to 0% moisture.

The invention thus provides a process for growing mycological biomaterials in a tool that is at least partially consumed in the process. The invention also provides a tool to house mycological biomaterials as they grow while contributing to the growth process.

Still further, the invention provides a process for growing mycological biomaterials in an economical manner.

What is claimed is:

1. A process of growing a mycological biomaterial comprising the steps of
    forming a growth medium including discrete particles, an inoculum including a preselected fungus and a nutrient material capable of being digested by said fungus;
    placing said growth medium in a tool formed of a material capable of being consumed by said fungus and defining a cavity of predetermined shape for said growth medium; and
    growing said fungus on and through said growth medium in said cavity of said tool to form a product corresponding to said predetermined shape of said cavity with said fungus consuming at least some of said tool.
2. A process as set forth in claim 1 wherein said tool is fully consumed by said fungus into said product.
3. A process as set forth in claim 2 wherein said tool is made of at least one of paper pulp, bamboo, papier-mâché, starches, plant seeds, alginates, gelatin, plant fibers, paper fibers, burlap, plant-derived nonwovens and wovens, and pre-grown mycelium sheets.

4. A process as set forth in claim 1 wherein said tool is partially consumed by said fungus into said product.

5. A process as set forth in claim 4 wherein said tool is made of at least one of synthetic fibers, glass fibers, carbon fibers, nylon fibers and plastic mesh materials.

6. A process as set forth in claim 1 wherein said tool is formed by creating a slurry of cellulose fibers, hemicellulose, water and nutrients; and vacuum pressing the slurry on a buck of a predetermined form to mold said tool.

\* \* \* \* \*